(12) United States Patent
Le et al.

(10) Patent No.: US 10,860,551 B2
(45) Date of Patent: Dec. 8, 2020

(54) IDENTIFYING HEADER LINES AND COMMENT LINES IN LOG FILES

(71) Applicant: Microsoft Technology Licensing, LLC, Redmond, WA (US)

(72) Inventors: Vu Minh Le, Kirkland, WA (US); Sumit Gulwani, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1044 days.

(21) Appl. No.: 15/365,142

(22) Filed: Nov. 30, 2016

(65) Prior Publication Data
US 2018/0150554 A1     May 31, 2018

(51) Int. Cl.
*G06F 17/00*     (2019.01)
*G06F 16/215*    (2019.01)
*G06N 20/00*     (2019.01)

(52) U.S. Cl.
CPC .......... *G06F 16/215* (2019.01); *G06N 20/00* (2019.01)

(58) Field of Classification Search
CPC ............................. G06F 16/215; G06N 20/00
See application file for complete search history.

(56) References Cited

U.S. PATENT DOCUMENTS

| | | |
|---|---|---|
| 7,606,816 B2 | 10/2009 | Kulkarni |
| 7,685,144 B1 | 3/2010 | Katragadda |
| 7,822,850 B1 | 10/2010 | Brikman et al. |
| 8,321,958 B1 | 11/2012 | Fleming et al. |
| 8,682,885 B2 | 3/2014 | Bolotnikoff et al. |
| 9,075,718 B2 | 7/2015 | Hinterbichler et al. |
| 9,171,080 B2 | 10/2015 | Song et al. |
| 9,251,413 B2 | 2/2016 | Meier et al. |
| 9,286,290 B2 | 3/2016 | Allen et al. |
| 2004/0254919 A1* | 12/2004 | Giuseppini ........... G06F 16/903 |
| 2006/0242180 A1 | 10/2006 | Graf et al. |
| 2008/0235297 A1 | 9/2008 | Lee |

(Continued)

OTHER PUBLICATIONS

Of Python: How to ignore #comment lines when reading in a file, published Nov. 10, 2009, retrieved on Dec. 9, 2019, retrieved from the Internet <URL: https://stackoverflow.com/questions/1706198/python-how-to-ignore-comment-lines-when-reading-in-a-fil (Year: 2009).*

(Continued)

*Primary Examiner* — Tyler J Torgrimson
(74) *Attorney, Agent, or Firm* — Medley, Behrens & Lewis, LLC

(57) ABSTRACT

Described herein are various technologies pertaining to processing a log file, such that the processed log file is well-suited for analysis by a programming by example (PBE) system. When processing the log file, header lines and comment lines in the log file can be automatically identified and filtered from the log file, such that the PBE system does not contemplate the header lines and comment lines. Further, when processing the log file, boundaries of records in the log file can be identified without requiring user input. The PBE system constructs a table based upon the identified boundaries of the records in the log file, wherein the table includes rows that correspond to the records, and further wherein the table fails to include rows that correspond to header lines and comment lines.

20 Claims, 9 Drawing Sheets

(56) References Cited

U.S. PATENT DOCUMENTS

| | | | |
|---|---|---|---|
| 2009/0282391 A1* | 11/2009 | Gutierrez | G06F 8/10 717/128 |
| 2015/0025875 A1 | 1/2015 | Perrone | |
| 2015/0026114 A1 | 1/2015 | Triff | |
| 2015/0095312 A1 | 4/2015 | Gulwani et al. | |
| 2016/0104077 A1 | 4/2016 | Jackson, Jr. et al. | |
| 2018/0089424 A1 | 3/2018 | Yang et al. | |
| 2018/0095983 A1 | 4/2018 | George | |
| 2018/0150500 A1 | 5/2018 | Le et al. | |
| 2019/0347267 A1 | 11/2019 | Le et al. | |

OTHER PUBLICATIONS

Colombo, et al., "Semi-structured data extraction and modelling: the WIA Project", In Proceedings of Italian Workshop on Artificial Life and Evolutionary Computation, Jul. 1, 2013, pp. 98-103.
"Notice of Allowance Issued in U.S. Appl. No. 15/365,103", dated Apr. 5, 2019, 13 Pages.

* cited by examiner

```
sep=,                                                                                402
CHECKSYM, (2.4:0.0)
Created:, "October 24, 2014 12:31:50"
Computer:,OPPEX001

[PROCESSES]
,Process Name, Process ID, Module Path, Symbol Status, Checksum, Time/Date Stamp,
,SMSS.EXE,416,C:\XXXXX\SYSTEM\SMSS.EXE,SYMBOLS_NO,0,0,"December 31, 1969 19:00:00",
,SMSS.EXE,416,C:\XXXXX\SYSTEM\NTDLL.DLL,SYMBOLS_NO,0,0,"December 31, 1969 19:00:00",
,CSRSS.EXE,632,C:\XXXXX\SYSTEM\CSRSS.EXE,SYMBOLS_NO,0,0,"December 31, 1969 19:00:00",
,CSRSS.EXE,632,C:\XXXXX\SYSTEM\NTDLL.DLL,SYMBOLS_NO,0,0,"December 31, 1969 19:00:00",
,CSRSS.EXE,632,C:\XXXXX\SYSTEM\CSRSRV.DLL,SYMBOLS_NO,0,0,"December 31, 1969 19:00:00",
,CSRSS.EXE,632,C:\XXXXX\SYSTEM\BASESRV.DLL,SYMBOLS_NO,0,0,"December 31, 1969 19:00:00",
,CSRSS.EXE,632,C:\XXXXX\SYSTEM\WINSRV.DLL,SYMBOLS_NO,0,0,"December 31, 1969 19:00:00",
```

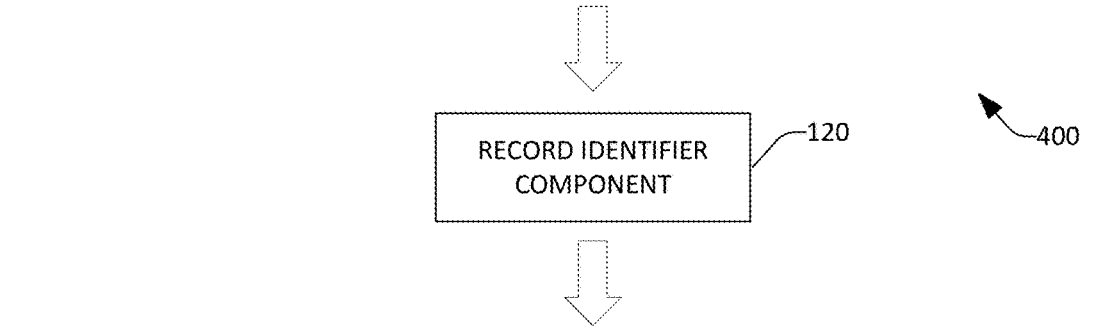

```
sep=,                                                                                404
CHECKSYM, (2.4:0.0)
Created:, "October 24, 2014 12:31:50"
Computer:,OPPEX001

[PROCESSES]
,Process Name, Process ID, Module Path, Symbol Status, Checksum, Time/Date Stamp,
,SMSS.EXE,416,C:\XXXXX\SYSTEM\SMSS.EXE,SYMBOLS_NO,0,0,"December 31, 1969 19:00:00",
,SMSS.EXE,416,C:\XXXXX\SYSTEM\NTDLL.DLL,SYMBOLS_NO,0,0,"December 31, 1969 19:00:00",
,CSRSS.EXE,632,C:\XXXXX\SYSTEM\CSRSS.EXE,SYMBOLS_NO,0,0,"December 31, 1969 19:00:00",
,CSRSS.EXE,632,C:\XXXXX\SYSTEM\NTDLL.DLL,SYMBOLS_NO,0,0,"December 31, 1969 19:00:00",
,CSRSS.EXE,632,C:\XXXXX\SYSTEM\CSRSRV.DLL,SYMBOLS_NO,0,0,"December 31, 1969 19:00:00",
,CSRSS.EXE,632,C:\XXXXX\SYSTEM\BASESRV.DLL,SYMBOLS_NO,0,0,"December 31, 1969 19:00:00",
,CSRSS.EXE,632,C:\XXXXX\SYSTEM\WINSRV.DLL,SYMBOLS_NO,0,0,"December 31, 1969 19:00:00",
```

FIG. 4

IDENTIFYING HEADER LINES AND COMMENT LINES IN LOG FILES

BACKGROUND

As computing devices have become ubiquitous, the volume of data produced by such computing devices has continuously increased. Organizations often wish to obtain insights about their processes, products, etc., based upon data generated by numerous data sources, wherein the data from different data sources may have different formats. To allow for these insights to be extracted from data, the data must first be "cleaned" such that a client application (such as an application that is configured to generate visualizations of the data) can consume the data and produce abstractions over the data.

In an example, server computing devices of an enterprise can be configured to output log files. These log files have a "flat" structure, in that a log file does not contain a (hierarchical) presentation of the data included in the log file (unlike a JSON document or an XML document). Further, log files tend to comprise unstructured or semi-structured data, rendering it difficult to analyze such data in its native form. For instance, an application executing on a server computing device can generate a log file that indicates times that particular actions were undertaken by the server computing device when executing the application. Data lines in a log file, however, may include semi-structured data, such that executing a query over the log file is problematic. Hence, it is often desirable to extract certain data from a log file and place the data in tabular form, such that a client application can then further process the data using standard tabular analysis tools.

Conventionally, it is cumbersome to extract data from log files and place it in tabular form. One exemplary approach is for a user (e.g., a data cleaner) to manually extract desired data from a log file and placing the extracted data in appropriate cells of a table. Log files, however, may include thousands to millions of lines of information and, therefore, this manual approach is often not possible. Another exemplary approach is for a programmer to write a script that extracts data from the log file and populates cells of a table based upon the data extracted from the log file. This approach, however, requires programming expertise. Further, different applications generate log files with different data structures; therefore, writing the program often is a one-off project, which is an inefficient use of programmer time.

Relatively recently, programming by example (PBE) technologies have been developed, where programs are synthesized based upon examples provided by end users. The structure of most log files, however, is not well-suited for PBE technologies. More specifically, log files tend to have various different types of lines therein, including but not limited to header lines, comment lines, and data lines. Thus, conventionally, an end user may be required to explicitly identify lines (such as comment lines and header lines) that do not include data that is of interest to the end user as negative examples. Further, for conventional PBE technologies to be employed to synthesize a program that is configured to extract data from a log file and place it appropriately in a table, the end user must explicitly identify boundaries of records in the log file. This may be burdensome for the end user, as the task of identifying record boundaries may not match the mental model of the user, who may simply care to extract certain fields.

SUMMARY

The following is a brief summary of subject matter that is described in greater detail herein. This summary is not intended to be limiting as to the scope of the claims.

Described herein are various technologies pertaining to constructing a table based upon a log file output by a computing device. The technologies are particularly well-suited for use in connection with PBE technologies, which are configured to synthesize a program based upon examples set forth by the end user, where the synthesized program is configured to extract data from the log file and construct a table based upon the extracted data. With more particularly, technologies described herein relate to: 1) processing a log file to identify, without user input, header lines and comment lines in the log file, and subsequently filtering such lines so that they are not considered when a program is synthesized by way of PBE technologies; 2) identifying, without user input, boundaries of records in the log file, wherein PBE technologies can synthesize a program based upon the identified record boundaries and examples set forth by the end user, and further where the program is configured to construct a table based upon data extracted from the log file; and 3) responsive to receipt of user input with respect to a character or set of characters in the log file (when the user is selecting a substring for provision as an example to be used when synthesizing a program), setting forth a suggestion as to boundaries of the substring.

With reference to 1) noted above, the observation that regular data lines occur more often inside a log file when compared to how often header lines and/or comment lines occur in the log file is leveraged to learn a regular expression that can distinguish the header and comment lines in the log file from the regular data lines in the log file. For example, a model of the log file can be constructed, wherein the model is indicative of patterns in the log file (e.g., a majority of lines in the log file start with a first symbol, and presumably are data lines, while a minority of lines in the log file start with a second symbol, and therefore may be comment lines or header lines). Based upon the model of the log file, a regular expression can be learned from a relatively small predefined grammar, where the regular expression distinguishes the comment and header lines from the data lines. Further described herein are technologies related to ranking regular expressions when more than one regular expression is learned that can distinguish comment and header lines from regular data lines. In another example, header lines can be distinguished from regular data lines based upon the inference that header lines typically occur at the top of the log file. Moreover, in some cases, column names for an output table produced by way of PBE technologies may be inferred. More specifically, name delimiters can be inferred from a predefined set of delimiters to identify potential column names, and a similarity measure can be computed between the extracted column names and the type of the value in the respective output columns.

With respect to 2), responsive to header lines and comments lines being identified (and filtered), a regular expression (from the predefined grammar of regular expressions) can be learned to identify boundaries of records in the log file. More specifically, the regular expression can be learned by identifying common starting or ending patterns in the data lines of the log file.

With respect to the 3, user selection of a substring in the log file (when setting forth an example) by way of highlighting may be tricky, as precise starting and ending characters must be captured. Further, typing an entire substring is tedious, especially when substrings can be somewhat large. To address these issues, a substring in a record (that is to be provided to a PBE system as an example) can be inferred once the user has identified the starting characters. The inference of the substring can be based upon analysis of token boundaries around the starting characters, wherein the tokens come from a predefined set. The ending character of the substring often aligns with the ending of some token, such as date, number, lowercase characters, etc. Using such inference, suggestions can be provided to the user. For instance, the suggestion can be "snapping" a cursor to a suggested substring boundary responsive to the user selecting a starting character, thereby assisting the user in selecting the substring in the log file that the user intends to set forth as an example to the PBE system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 is a schematic that depicts identification header lines and comment lines in a log file.

DETAILED DESCRIPTION

Figure 1:
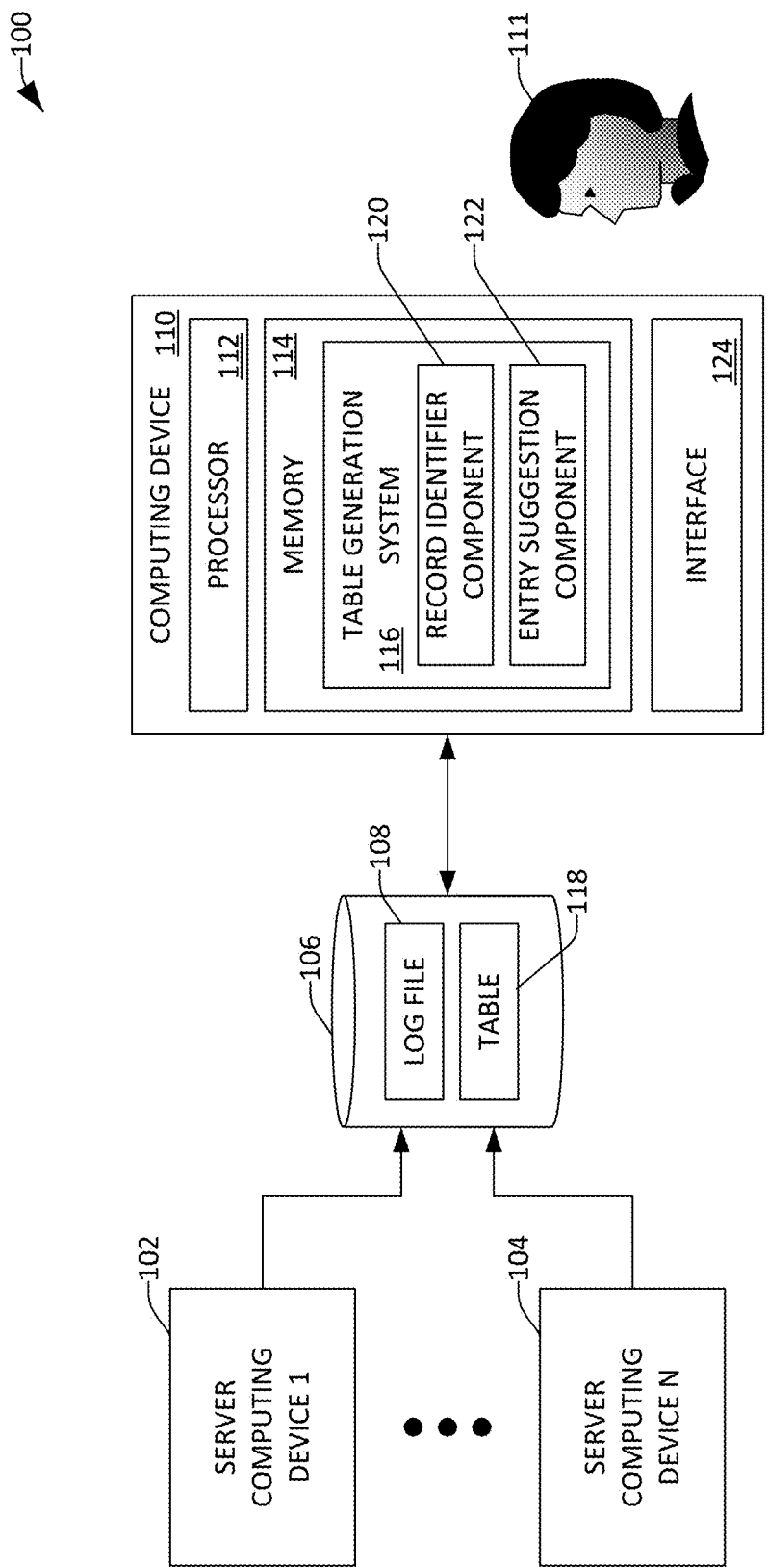
FIG. 1 is a functional block diagram of an exemplary system that facilitates constructing a table based upon a log file output by a computing device.

Various technologies pertaining to processing log files to render the log files well-suited for use with programming by example (PBE) technologies are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to constructing tables based upon log files. With more particularity, technologies described herein relate to processing log files generated by computing devices, such that PBE technologies can be readily applied with respect to the processed log files. Log files are flat (non-hierarchical) files generated by computing devices. In an example, a computer-executable application can be configured to generate a log file that represents actions performed by the application (or by users of the application) over time. Log files typically include several lines of different types, where exemplary types of lines include header lines, comment lines, and data lines. Header lines often include data that is not well-suited for extraction from the log file and inclusion in a table. Such data can, for instance, identify an application that generated the log file, a time when the log file was constructed, and the like. Comment lines typically include user-generated content, often in the form of a text string. Again, information in comment lines is often not well-suited for inclusion in a table.

Data lines of a log file, however, include information that is often desirably extracted from the log file and placed into appropriate cells of a table. More specifically, the log file includes records, wherein each record includes at least a portion of a data line (although a record may include multiple data lines). A record of a log file includes a string, where the string comprises several substrings. In a non-limiting example, a record in a log file may include substrings pertaining to the following entities: process name, process ID, module path, symbol status, checksum, and time stamp. In many scenarios, it is desirable for the end user to identify a substring as being a field of a record, where the field and corresponding fields of other records in the log file are to be extracted from the log file and included in columns of an output table.

As indicated previously, the structure of log files (e.g., that log files typically include lines of various types) causes difficulties when PBE techniques are applied over log files. These difficulties are at least partially due to differences in structure between header lines, comment lines, and data lines in log files, and is further at least partially due to requiring an end-user to explicitly identify boundaries of records in log files. The technologies described herein pertain to processing log files, such that header lines and comment lines in the log file are identified without requiring user input. In other words, header lines and comment lines can be distinguished from data lines in the log file, such that a PBE system can skip over the header lines and comments lines when synthesizing a program based upon examples set forth by the user. Technologies described herein also pertain to identifying, without user input, record boundaries in the log file. This may include, for instance, determining that some records are portions of a single data line of a log file, some records include a single data line in the log file, and other records include multiple data lines in the log file.

Still further, described herein are technologies that pertain to setting forth suggestions to an end user when the end user identifies starting characters of a substring of a record. More specifically, when using PBE technologies, the user sets forth examples to a PBE system, wherein the examples can include an identification of a substring in a record of the log file. When the user identifies starting characters of the substring, the technologies described herein can automatically suggest an ending boundary of the substring. For instance, when the user highlights a character in a substring of a record, the highlighted region can be "snapped to" a most likely ending character of the substring.

With reference now to FIG. 1, an exemplary system 100 that facilitates processing a log file output by a computing device, such that the processed log file is well-suited for use in connection with PBE technologies, is illustrated. The system 100 is described as being included in an environment where data cleaning is to be performed, although the claimed technologies are applicable to other scenarios. For instance, an enterprise may include a plurality of server computing devices 102-104, wherein data in log files generated by applications executing on the server computing devices 102-104 is desirably subject to analysis (e.g., it is desirable for client applications to produce abstractions over data in the log files, such as creation of visualizations of data in the log files). The system 100 further includes a data store 106 that is in communication with the server computing devices 102-104. While the data store 106 is illustrated as being separate from the server computing devices 102-104, it is to be understood that the data store 106 can be considered as a portion of at least one of the server computing devices 102-104. A server computing device in the server computing devices 102-104 outputs a log file 108, wherein the log file 108 is retained in the data store 106. As indicated previously, the log file is a flat (non-hierarchical) file that can include lines of various types, wherein exemplary types of lines include header lines, comment lines, and data lines.

The system 100 further comprises a computing device 110 that is in communication with the data store 106, such that the computing device 110 can access the log file 108. The computing device 110 can be operated by a data cleaner 111, who is tasked with constructing an output table based upon content in the data lines of the log file 108, wherein the output table comprises cells that are populated based upon data extracted from the log file 108. The computing device 110 includes at least one processor 112 and memory 114 that has a table generation system 116 loaded therein. Briefly, the table generation system 116 is configured to extract data from the log file 108 and construct a table 118 based upon the data extracted from the log file 108. The table generation system 116 is configured to perform this task using PBE technologies. Thus, the data cleaner 111 identifies a portion of the log file 108 (e.g., a substring) that is to be extracted from the log file 108, wherein a cell in the table 118 is to be populated based upon the portion of the log file 108 identified by the data cleaner 111. That is, the table generation system 116 receives the substring identified by the data cleaner 111, and synthesizes a program based upon the substring, wherein the program, upon receiving the log file 108 as input, outputs the table 118, wherein the table 118 includes a column of cells that are populated with substrings that correspond to the substring identified by the data cleaner 111.

Prior to synthesizing such program, however, the table generation system 116 processes the log file 108 such that the log file 108 is well-suited for PBE technologies. To that end, the table generation system 116 includes a record identifier component 120 that, prior to the data cleaner 111 setting forth examples, is configured to identify header lines and comment lines in the log file 108 and filter such lines from the log file 108 (without requiring the data cleaner 111 to explicitly distinguish comment and header lines from data lines in the log file 108). The record identifier component 120 may utilize a variety of technologies in connection with distinguishing comment and header lines versus data lines in the log file 108.

In a first example, the record identifier component 120 can load a portion of the log file 108 into the memory 114 (e.g., 200 lines of the log file 108). The record identifier component 120 can construct a model of the portion of the log file 108, and can identify a dominant pattern in the model. More specifically, since it is highly likely that there are several more data lines than there are comment or header lines, the record identifier component 120 can infer that lines in the portion of the log file 108 that conform to the dominant pattern are data lines, while other lines in the portion of the log file 108 loaded into the memory 114 (which do not conform to the dominant pattern) are comment or header lines. Thus, based upon patterns identified in the model of the portion of the log file 108, the record identifier component 120 can learn a regular expression (from a relatively small predefined grammar) that distinguishes between the data lines in the portion of the log file 108 and comment and header lines in such portion of the log file 108. The regular expression can be applied to the log file 108, such that comment lines and header lines can be filtered from the log file 108.

In some instances, the record identifier component 120 may learn multiple regular expressions that can distinguish between comment and header lines versus data lines. In such a case, the record identifier component 120 can rank the regular expressions according to a ranking metric. In an example, the ranking metric may be length of the regular expression, such that the shortest learned regular expression that can be used to distinguish between comment and header lines versus data lines in the log file 108 is ranked most highly. In another example, the metric may be number of occurrences of the regular expression in the portion of the log file 108 loaded into the memory 114. For instance, a single break may separate consecutive data lines in the portion of the log file 108, while multiple breaks may separate data lines from comment lines and header lines from data lines. Since consecutive line breaks will occur relatively infrequently in the portion of the log file 108, the regular expression may be ranked more highly than a regular expression that is applicable a larger number of times in the portion of the log file.

The record identifier component 120 can further distinguish header lines from data lines based upon the knowledge that header lines tend to occur at the top of log files. Therefore, the record identifier component 120 can construct a model of the portion of the log file 108, and determine a dominant pattern in the portion of the log file 108 (which presumably corresponds to data lines in the portion of the log file 108). The record identifier component 120 may then start at the top of the portion of the log file 108, and go line by line until a line in the portion of the log file 108 conforms to the dominant pattern is reached. The record identifier component 120 can identify the first k lines that do not conform to the dominant pattern as being header lines, and can filter such k lines from the log file 108.

In some cases, the log file 108 will include a line that comprises potential column names in the output table 118. For instance, the line can comprise delimiters that separate potential column names in the line. This line oftentimes conforms to the dominant pattern identified by the record identifier component 120; however, substrings in this line appear different from corresponding substrings in other lines that conform to the dominant pattern. The record identifier component 120 can analyze the line, searching for delimiters from a predefined set of delimiters. When such line is identified, it can be inferred that substrings between the delimiters in this line represent potential column names in the output table 118.

The record identifier component 120, as referenced above, can further identify, without user input, boundaries of records in the log file 108. To accomplish such task, the record identifier component 120 can analyze the portion of the log file 108 referenced above, and can build a model of the portion of the log file 108. The model, for instance, can indicate that 193 lines start with a comma, while 7 lines do not start with a comma. This indicates that the lines that start with a comma correspond to separate records, and that a record is bounded at the front by a comma. In another example, the model of the portion of the log file 108 loaded into the memory 114 can indicate that 180 lines start with a timestamp, while 20 lines do not. The record identifier component 120, based upon this model, can learn a regular expression from the aforementioned predefined grammar, where the regular expression indicates that each record is bounded at the front by a timestamp. Once the record identifier component 120 has identified, without user input, comment lines and header lines in the log file 108, and has further identified, without user input, boundaries of records in the log file 108, the table generation system 116 can utilize the processed log file 108 and can construct a table based upon examples set forth by the data cleaner 111. It can be ascertained that these examples set forth by the data cleaner 111 need not include identification of record boundaries from the data cleaner 111, and further need not include negative examples set forth by the data cleaner 111 (e.g., the data cleaner 111 need not explicitly identify header lines and comment lines in the log file 108).

The table generation system 116 further includes an entry suggestion component 122 that is configured to assist the data cleaner 111 when the data cleaner 111 is providing examples to the table generation system 116. More specifically, the computing device 110 includes an interface 124 (e.g., a keyboard, a soft keyboard, a touch-sensitive display, a mouse, etc.) that is employed by the data cleaner 111 to set forth examples to the table generation system 116. As mentioned previously, each record in the log file 108 may include a string, wherein the string includes several substrings (which may be fields of the record). It is often the case that the data cleaner 111 desires that a column in the output table 118 corresponds to a substring in the record. Conventionally, the data cleaner 111 interacts with the interface 124 to set forth an example, wherein the example must precisely identify the substring that is to be extracted from the log file 108. The data cleaner 111, however, may accidentally select an incorrect portion of the string of the record, such that the table 118 output by the table generation system 116 does not reflect the intent of the data cleaner 111. In another example, the data cleaner 111 may interact with the interface 124 to type the substring that is to be extracted from the log file 108. When there is a typo in the information set forth by the data cleaner 111 to the table generation system 116, the table 118 output by the table generation system 116 will not reflect the intent of the data cleaner 111.

To cure these deficiencies, the entry suggestion component 122 is configured to set forth at least one suggestion to the data cleaner 111 based upon an initial character or set of characters selected by the data cleaner 111 in a string of the log file 108. In a non-limiting example, when the data cleaner 111 highlights a character or characters in the string in the log file 108, the entry suggestion component 122 can cause a cursor to "snap to" a suggested endpoint of a substring, where the substring is bounded by the highlighted characters and a predicted ending boundary of the substring. For instance, when a string includes a plurality of alphabetical characters followed by a whitespace, followed by a plurality of numerical characters, and the data cleaner 111 selects (e.g., by way of a mouse) a first alphabetical character in the alphabetical characters, the entry suggestion component 122 can cause a cursor to "snap to" the last alphabetical character in the alphabetical characters, such that the alphabetical characters are highlighted but the numerical characters are not highlighted. If the data cleaner 111 wishes to also include the numerical characters in the substring in an example that is to be set forth to the table generation system 116, the data cleaner 111 can drag the mouse over a first character in the numerical characters and the entry suggestion component 122 can cause a cursor to "snap to" the last numerical character in the string. In another example, when the data cleaner 111 uses a keyboard to identify starting characters in a substring, the entry suggestion component 122 can auto-populate a field with a suggested substring or provide a list of suggestions from which the user can select one of the suggestions, thereby reducing data entry errors.

The entry suggestion component 122, in connection with identifying suggestions, can tokenize the entire string of a record using a predefined set of tokens (e.g., a first token can represent capital letters, a second token can represent lowercase letters, a third token can represent white space, a fourth token can represent numerical values, a fifth token can represent punctuation, etc.). Responsive to tokenizing the string of the record, and in response to receiving some input as to a start of a substring from the data cleaner 111, the entry suggestion component 122 can suggest an ending boundary of the substring based upon token boundaries in the string in the record. For instance, a whitespace between a first plurality of alphabetical characters and a second plurality of alphabetical characters can indicate a potential substring boundary when an indication is received that the data cleaner 111 has selected a first character in the first plurality of alphabetical characters. In another example, a change from alphabetical characters to numeric characters can indicate a potential boundary when an indication is received that the data cleaner 111 has selected a first alphabetical character in the alphabetical characters. The entry suggestion component 122 can identify a prospective ending character of a substring by identifying the ending of some token, such as date, number, lowercase characters, etc. In addition, the entry suggestion component 122 may identify a plurality of suggestions and can rank such suggestions based upon any suitable metric. In an example, the entry suggestion component 122 can rank suggestions based upon selections that the data cleaner 111 has made in identifying other substrings being extracted from the log file 108.

Figure 2:
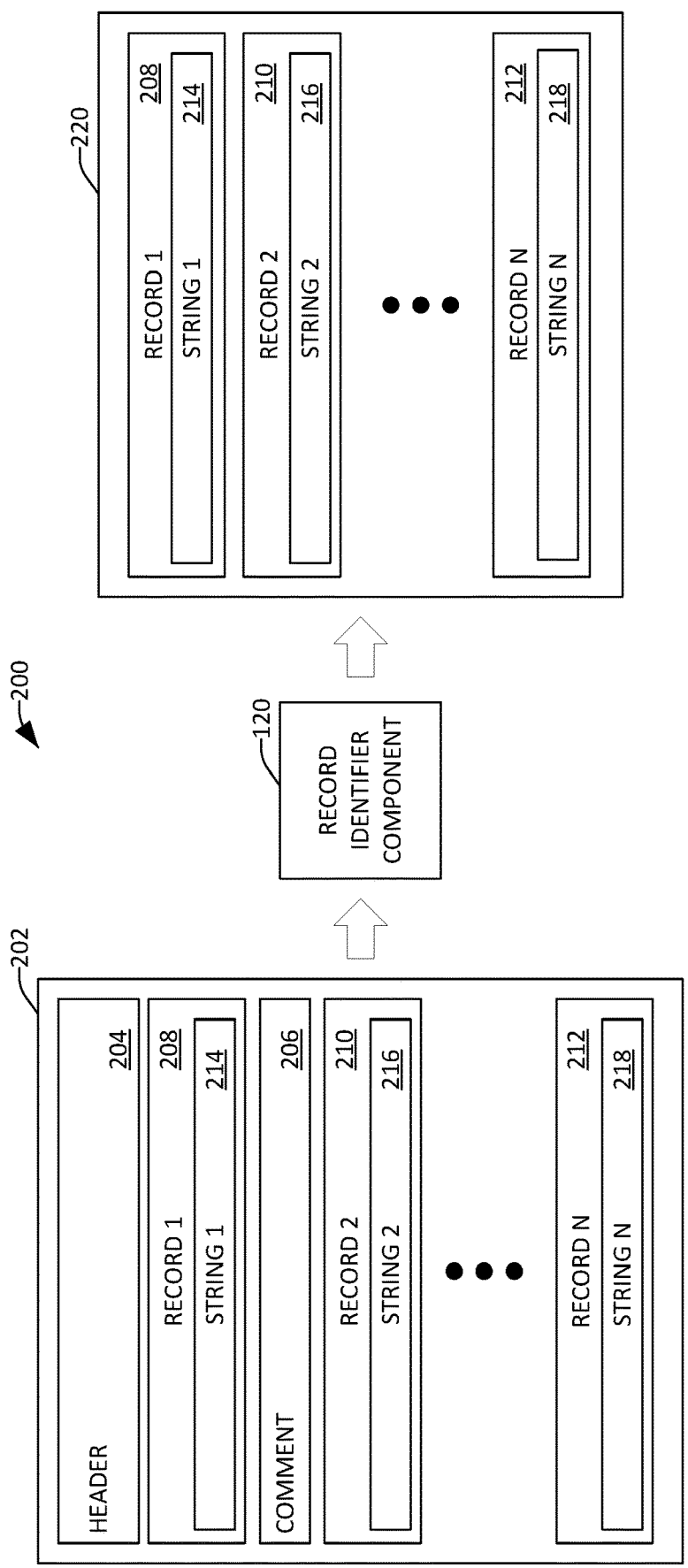
FIG. 2 is a schematic that depicts header and comment lines of a log file being identified without user input.

Now turning to FIG. 2, an exemplary schematic 200 that visually depicts processing of a log file 202 that can be performed by the record identifier component 120 is illustrated. As shown in FIG. 2, the log file 202 includes a header 204, which may include a plurality of header lines, as well as a comment 206, which may include a plurality of comment lines. The log file 202 further comprises a plurality of records 208-212, wherein each record may include a string, and wherein each string may include a plurality of fields. For instance, the first record 208 includes a first string 214, the second record 210 includes a second string 216, and the nth record includes an nth string 218. The record identifier component 120, as noted above, without user input, identifies the header 204 and the comment 206 in the log file 202. As indicated previously, the record identifier component 120 can construct a model of the log file 202, identify a dominant pattern for lines in the log file 202, and identify the first k lines that do not correspond to the dominant pattern as being the header 204. Additionally or alternatively, the record identifier component 120 can learn a regular expression that distinguishes the header 204 and/or the comment 206 from the records 208-212. For instance, comment lines in the comment 206 may start with a hash tag symbol, while other lines in the log file 202 start with a timestamp (e.g., where the dominant pattern is the timestamp beginning a line). The regular expression learned by the record identifier component 120 can distinguish between lines in the header 204 and/or the comment 206 from the data lines in the log file 202.

Responsive to the record identifier component 120 identifying header lines and/or comment lines in the log file 202, the record identifier component 120 can learn one or more regular expressions that are indicative of boundaries of the records 208-212 in the log file 202. It is to be understood that it is not always the case that a new line in the log file 202 corresponds to a new record. For instance, a record of a log file may include multiple lines, and the regular expression learned by the record identifier component 120 can identify record boundaries that occur across multiple lines. The record identifier component 120 can output a processed log file 220, such that when the table generation system 116 generates the table 118 based upon examples set forth by the data cleaner 111, the header 204 and the comment 206 in the log file 202 are effectively skipped over by the table generation system 116. Additionally, the table generation system 116 constructs the table 118 based upon the identified record boundaries.

Figure 3:
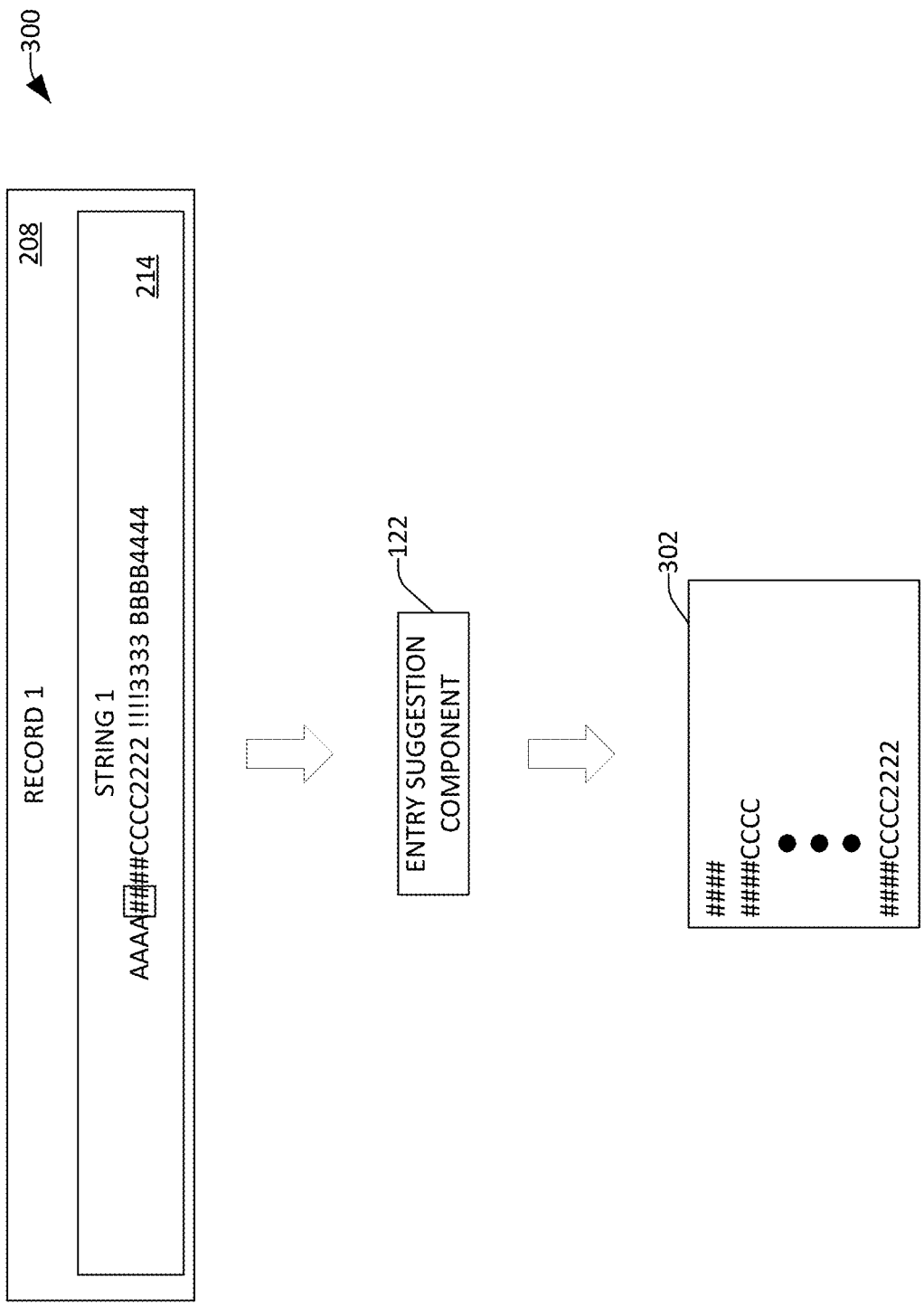
FIG. 3 is a schematic that depicts generation of suggestions based upon user selection of characters in a string of a record in a log file.

With reference now to FIG. 3, an exemplary schematic 300 that depicts operation of the entry suggestion component of 122 is illustrated. As indicated previously, the first record 208 of the log file 202 can include the first string 214, and the string can include several fields (where a field is a substring of the string 214 that is to be extracted from the record 208). Boundaries between fields may not be readily identifiable without explicit user input. Conventionally, the data cleaner 111 is required to precisely identify the desired substring in the first string 214, where the data cleaner 111 may incorrectly identify a field (e.g., the data cleaner 111 may mis-click). As indicated previously, the entry suggestion component 122 can tokenize the string in the record 208, where potential field boundaries can be indicated by token boundaries. Thus, in this example, when the data cleaner 111 highlights characters corresponding to the token sequence "##" (e.g., the beginning of a field), the entry suggestion component 122 can compute a plurality of suggestions for the end of the field. For instance, a cursor can be "snapped to" the character corresponding to the token boundary between the "#" token and the "C" token. The entry suggestion component 122 can determine several suggestions 302, rank the suggestions, and select a suggestion based upon the ranking (e.g., the entry suggestion component 122 can rank the suggestions based upon previous input set forth by the data cleaner 111).

Now referring to FIG. 4, another schematic 400 illustrating operation of the record identifier component 120 with respect to an exemplary log file 402 is illustrated. In the exemplary log file 402, a header of the log file 402 is included in the first six lines of the log file 402. The record identifier component 120 can construct a model of the log file 402, which indicates that a relatively large number of lines start with a comma, while a relatively small number of lines do not. Thus, the dominant pattern identified by the record identifier component 120 is a comma at the beginning of a line. When identifying the header, the record identifier component 120 can start at the top of the log file 402 and go line by line downward until a line having the dominant pattern is reached (which can inferred to be a line other than a header line). In this case, the record identifier component 120 can identify that the top six lines do not conform to the dominant pattern, and can therefore identify such lines as header lines in the log file 402.

It can also be ascertained that the seventh line in the log file 402 includes delimiters that separate potential column names in the output table 118. The seventh line, however, is clearly distinguishable from the lines that follow it. The record identifier component 120 can determine, for instance, that length of the seventh line is somewhat shorter than all lines that follow it, and can infer that the seventh line includes delimiters that separates text that corresponds to column names. In another example, the record identifier component 120 can analyze text in the seventh line and can compare the text with other lines in the log file 402, and can infer that the seventh line in the log file 402 includes delimiters (e.g., commas) from amongst a plurality of predefined delimiters. The record identifier component 120 outputs a processed log file 404, where the header lines and the line that include the potential column names are shown as being struck through, such that the table generation system 116 skips those lines when extracting data from the log file 402 for inclusion in the table 118 (based upon example set forth by the data cleaner 111).

Figure 5:
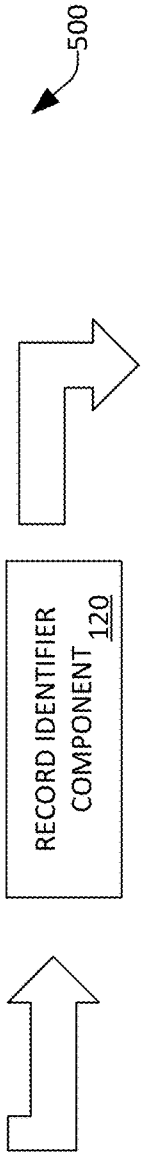
FIG. 5 is a schematic that depicts of identifying record boundaries in a log file without receipt of user input.

Now referring to FIG. 5, another exemplary schematic 500 that illustrates operation of the record identifier component 120 is illustrated. A log file 502 includes a plurality of data lines. In this example, the record identifier component 120 identifies, without input from the data cleaner 111, boundaries of records in the log file 502. The record identifier component 122 constructs a model of the log file 502, wherein the model can indicate that the majority of lines in the log file 502 start with a timestamp. Lines 7, 8, and 9 in the log file 502, however, fail to include a timestamp. Since the record identifier component 120 has already determined that lines 7-9 of the log file 502 are not header lines or comment lines (e.g., the record identifier component 120 identifies record boundaries subsequent to identifying header and comment lines), the record identifier component 120 can learn a regular expression that delineates boundaries of records in the log file 502. In this example, the regular expression can correspond to a timestamp. Thus, lines 6-9 in the log file 502 all belong to one record (as shown in a processed log file 504), while other records include a single line. The record identifier component 120 can output a processed log file 502, where boundaries of records are delineated.

Figure 6:
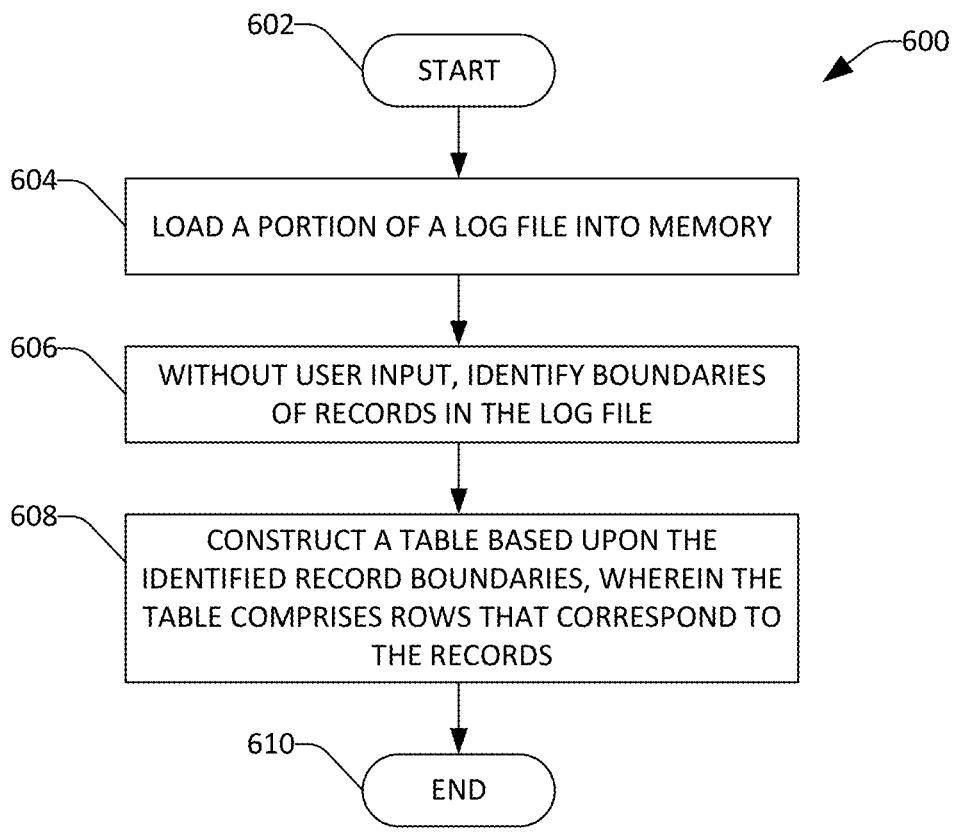
FIG. 6 is a flow diagram illustrating an exemplary methodology for constructing a table based upon identified record boundaries in a log file.
Figure 7:
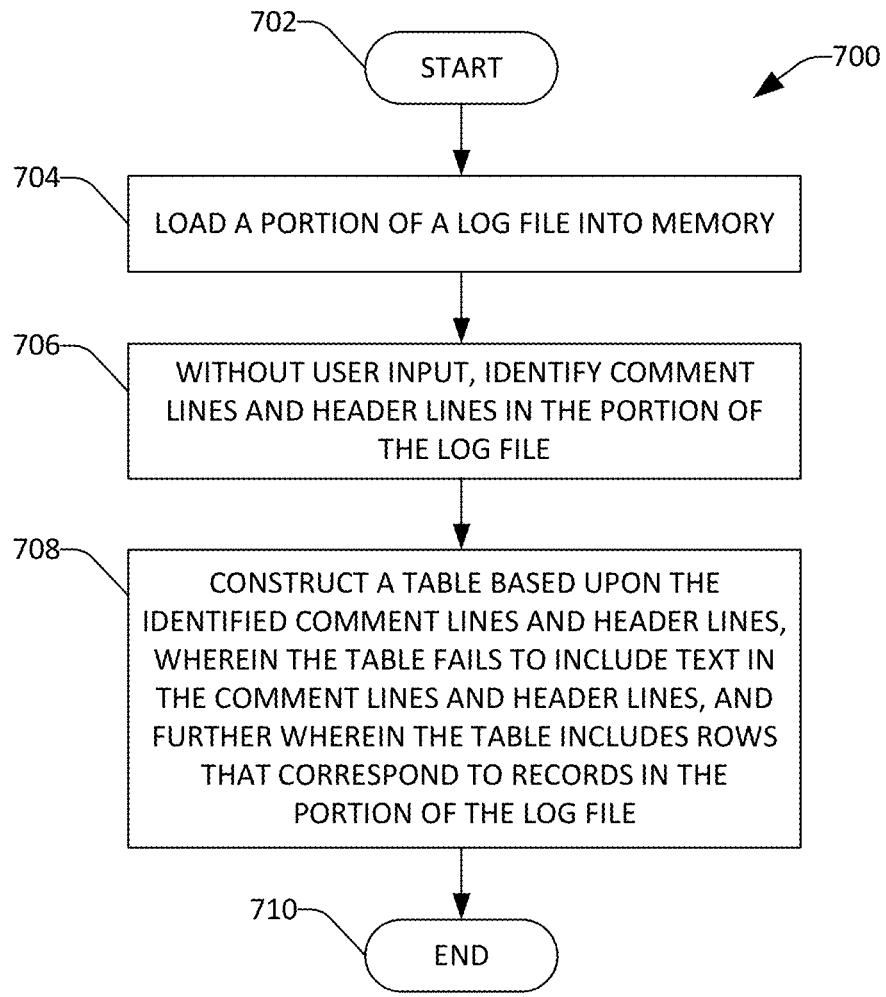
FIG. 7 is a flow diagram illustrating an exemplary methodology for constructing a table based upon identified comment and header lines in a log file.
Figure 8:
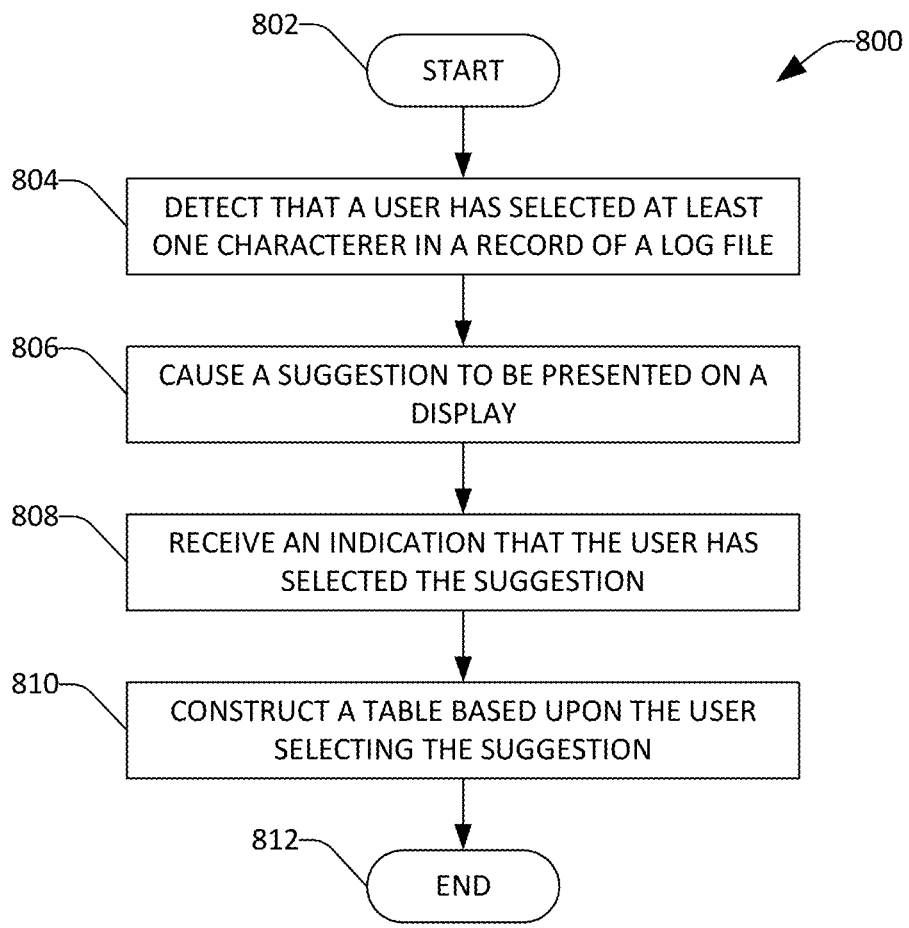
FIG. 8 is a flow diagram that illustrates an exemplary methodology that facilitates providing suggestions to an end-user with respect to potential entries in a table.

FIGS. 6-8 illustrate exemplary methodologies relating to processing a log file in connection with constructing a table based upon data extracted from the log file. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring solely to FIG. 6, an exemplary methodology 600 for constructing a table based upon automatically identified record boundaries is illustrated. The methodology 600 starts at 602 and, at 604, a portion of a log file is loaded into memory of a computing device. At 606, without user input, boundaries of records in the log file are identified. As described above, these boundaries can be identified responsive to header lines and comment lines in the log file being distinguished from data lines in the log file, and can further be identified by learning a regular expression that is indicative of record boundaries in the log file. At 608, a table is constructed based upon the identified record boundaries, wherein the table comprises rows that correspond to the identified records. Such tables, as noted above, are also constructed based upon fields in the log file identified by the data cleaner 111 (and provided as examples to the table generation system 116). The methodology 600 completes at 610.

Now referring to FIG. 7, an exemplary methodology 700 that facilitates constructing a table based upon identified comment lines and header lines in a log file is illustrated. The methodology 700 starts at 702, and at 704, a portion of a log file is loaded into memory of a computing device. At 706, without user input, comment lines and header lines are identified in the portion of the log file. As described above, a model of the log file can be constructed, and header lines can be identified as being the top k lines in the log file that do not conform to a dominant pattern in the model. Additionally or alternatively, a regular expression can be learned that distinguishes header lines and comment lines from data lines in the log file. At 708, a table is constructed based upon the identified comment lines and header lines, wherein the table fails to include text in the comment rows and header rows, and further wherein the table includes rows that correspond to records in the log file. The methodology 700 completes at 710.

Turning now to FIG. 8, an exemplary methodology 800 that facilitates assisting a data cleaner in identifying a field that is to be extracted from a record in the log file is illustrated. The methodology 800 starts at 802 and, at 804, it is detected that a user has selected at least one character in a record of a log file. The at least one character can be inferred to be the beginning character of a field that is desirably extracted by a data cleaner. At 806, a suggestion is caused to be presented on a display responsive to detecting that the data cleaner has selected the at least one character. For instance, the suggestion may be: 1) a "snap to" a potential field boundary; 2) auto-populating a text entry field corresponding to a potential field boundary, etc. At 808, an indication is received that the user has selected the suggestion (confirming the suggested field boundary) and, at 810 a table is constructed based upon the user selecting the suggestion (e.g., the selected field is provided to the table generation system 116 as an example, and a program is learned that extracts corresponding fields in other records of the log file based upon such example). The methodology 800 completes at 812.

Figure 9:
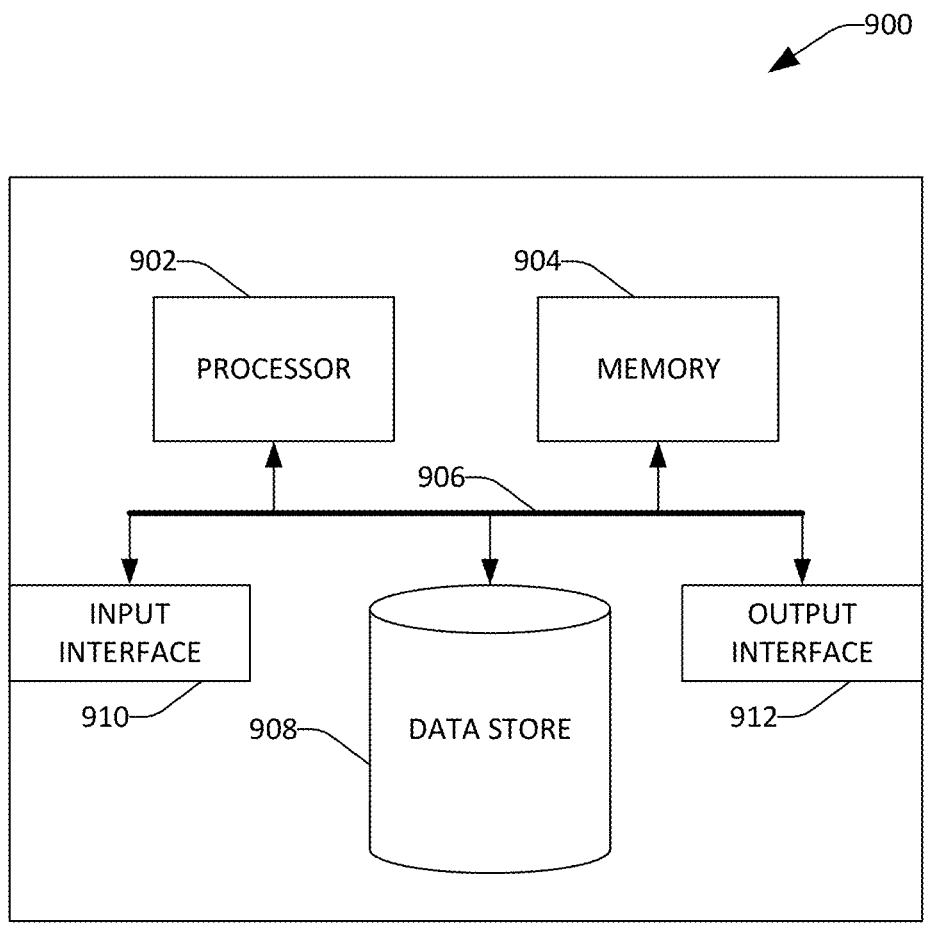
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be used in a system that distinguished header lines and comments lines in a log file from data lines in the log file. By way of another example, the computing device 900 can be used in a system that is configured to identify record boundaries in a log file. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store log files, tables, etc.

The computing device 900 additionally includes a data store 908 that is accessible by the processor 902 by way of the system bus 906. The data store 908 may include executable instructions, log files, output tables, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
    at least one processor; and
    memory storing instructions that, when executed by the at least one processor, cause the at least one processor to perform acts comprising:
        without user input, identifying, in a log file created by a computing device, boundaries of a plurality of records in the log file, wherein identifying the boundaries of the plurality of records in the log file comprises:
            reading a portion of the log file into the memory;
            learning a regular expression based upon the portion of the log file,
        wherein the regular expression is indicative of the boundaries of records in the portion of the log file,
            wherein the boundaries of the plurality of records in the log file are identified based upon the regular expression; and
        constructing a table based upon the identified boundaries of the plurality of records in the log file, wherein the table comprises a plurality of rows, and further wherein the plurality of rows in the table correspond to the identified boundaries of the plurality of records in the log file.

2. The computing system of claim 1, wherein identifying the boundaries of the plurality of records in the log file comprises:
    without user input, identifying header lines in the log file; and
    filtering the header lines from the log file.

3. The computing system of claim 1, wherein identifying the boundaries of the plurality of records in the log file comprises:
    without user input, identifying comment lines in the log file; and
    filtering the comment lines from the log file.

4. The computing system of claim 1, wherein identifying the boundaries of the plurality of records in the log file comprises:
    learning a plurality of regular expressions based upon the portion of the log file; and
    ranking the plurality of regular expressions based upon a ranking metric, wherein the regular expression is a most highly ranked regular expression in the plurality of regular expressions.

5. The computing system of claim 1, wherein the regular expression corresponds to a beginning of each record in the plurality of records.

6. The computing system of claim 1, wherein the regular expression corresponds to an end of each record in the plurality of records.

7. The computing system of claim 1, wherein a record in the plurality of records comprises a string, and the string comprises a plurality of substrings, the acts further comprise:
    receiving a user selection of a beginning of a substring in the plurality of substrings;
    identifying the substring in the plurality of substrings responsive to receiving the user selection of the beginning of the substring; and
    using programming-by-example technologies, constructing the table based upon the identified sub string in the plurality of substrings.

8. The computing system of claim 7, wherein identifying the substring in the plurality of substrings comprises:
    tokening the string record to form a plurality of tokens;
    identifying boundaries between tokens of different types in the plurality of tokens; and
    identifying the substring in the plurality of substrings based upon at least one boundary in the identified boundaries between the tokens.

9. The computing system of claim 8, the acts further comprising:

causing a plurality of potential substrings in the string to be presented on a display, wherein the plurality of potential substrings includes the substring; and receiving a selection of the sub string from amongst the plurality of potential substrings.

10. A method executing by at least one processor of a computing system, the method comprises:

without user input, identifying at least one of a comment line or a header line in a log file, wherein the log file is output by a computing device, and further wherein the log file comprises:

the at least one of the comment line or the header line; and a plurality of records;

without user input, identifying, in the log file output by the computing device, boundaries of a plurality of records in the log file, wherein identifying the boundaries of the plurality of records in the log file comprises:

learning a regular expression based upon a portion of the log file, wherein the regular expression is indicative of the boundaries of records in the portion of the log file, wherein the boundaries of the plurality of records in the log file are identified based upon the regular expression; and based upon the identifying of the at least one of the comment line or the header line in the log file, and further based upon boundaries of the plurality of records in the log file, constructing a table that has a plurality of rows that correspond to the plurality of records, wherein the table fails to include the at least one of the comment line or the header line.

11. The method of claim 10, wherein identifying the at least one of the comment line or the header line in the log file comprises identifying the comment line in the log file.

12. The method of claim 10, wherein identifying the at least one of the comment line or the header line in the log file comprises identifying the header line in the log file.

13. The method of claim 10, wherein identifying the at least one of the comment line or the header line in the log file comprises identifying both the comment line and the header line in the log file.

14. The method of claim 10, wherein identifying the at least one of the comment line or the header line in the log file comprises learning a regular expression that is indicative of the at least one of the comment line or the header line in the log file.

15. The method of claim 10, wherein a record in the plurality of records comprises a string, and wherein the string comprises a plurality of substrings, the method further comprises:

receiving a user selection of a beginning of a substring in the plurality of substrings;

identifying the substring in the plurality of substrings responsive to receiving the user selection of the beginning of the substring; and constructing the table based upon the identified substring in the plurality of substrings by using a programming by example technique.

16. The method of claim 15, further comprising:

responsive to identifying the substring in the plurality of substrings, presenting the substring as a suggestion for a field boundary in the table;

receiving a user selection of the suggestion; and constructing the table responsive to receiving the user selection of the suggestion, wherein an entry in the table is populated with the substring.

17. A computing system comprising:

a processor; and memory storing instructions that, when executed by the processor, cause the processor to perform acts comprising:

without user input, identifying at least one header line and at least one comment line in a log file, wherein the log file is output by a computing device, and further wherein the log file comprises:

the at least one header line;

the at least one comment line; and a plurality of data lines;

subsequent to identifying the at least one header line and the at least one comment line in the log file, without user input, identifying boundaries of a plurality of records in the log file, wherein each record in the plurality of records includes at least a portion of at least one data line in the plurality of data lines, and further wherein identifying the boundaries of the plurality of records in the log file comprises:

learning a regular expression based upon a portion of the log file, wherein the regular expression is indicative of the boundaries of records in the portion of the log file, wherein the boundaries of the plurality of records in the log file are identified based upon the regular expression; and constructing a table that has a plurality of rows that correspond to the plurality of records, wherein the table fails to include rows that correspond to the at least one header line and the at least one comment line.

18. The computing system of claim 17, the acts further comprising filtering the at least one header line and the at least one comment line from the log file prior to constructing the table.

19. The computing system of claim 17, wherein identifying the boundaries of the plurality of records in the log file comprises:

learning a plurality of regular expressions based upon the portion of the log file; and ranking the plurality of regular expressions based upon a ranking metric, wherein the regular expression is a most highly ranked regular expression in the plurality of regular expressions.

20. The computing system of claim 17, wherein a record in the plurality of records comprises a string, and the string comprises a plurality of substrings, the acts further comprising:

receiving a user selection of a beginning of a sub string in the plurality of substrings;

identifying the substring in the plurality of substrings responsive to receiving the user selection of the beginning of the substring; and using programming-by-example technologies, constructing the table based upon the identified sub string in the plurality of substrings.

* * * * *